(12) United States Patent
Kaneko et al.

(10) Patent No.: US 6,809,442 B2
(45) Date of Patent: Oct. 26, 2004

(54) STATOR STRUCTURE FOR ROTARY ELECTRIC MACHINE

(75) Inventors: Yutaro Kaneko, Yokohama (JP); Shinichiro Kitada, Tokyo (JP); Toshio Kikuchi, Yokosuka (JP); Takashi Tsuneyoshi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 88 days.

(21) Appl. No.: 10/211,283

(22) Filed: Aug. 5, 2002

(65) Prior Publication Data

US 2003/0057797 A1 Mar. 27, 2003

(30) Foreign Application Priority Data

Sep. 26, 2001 (JP) ........................................ 2001-293360

(51) Int. Cl.[7] .................................................. H02K 9/00
(52) U.S. Cl. ............................ 310/58; 310/52; 310/54; 310/59; 310/214; 310/194; 310/43; 310/85; 310/86
(58) Field of Search ................................. 310/217, 214, 310/54

(56) References Cited

U.S. PATENT DOCUMENTS

| | | | | |
|---|---|---|---|---|
| 2,986,663 A | * | 5/1961 | Ellis et al. | 310/214 |
| 5,990,588 A | * | 11/1999 | Kliman et al. | 310/86 |
| 6,113,024 A | * | 9/2000 | Pittard et al. | 310/214 |
| 6,313,558 B1 | * | 11/2001 | Abukawa et al. | 310/216 |
| 6,369,470 B1 | * | 4/2002 | Kylander et al. | 310/52 |
| 6,515,384 B1 | * | 2/2003 | Kikuchi et al. | 310/54 |
| 6,611,076 B2 | * | 8/2003 | Lindbery et al. | 310/216 |
| 6,661,133 B2 | * | 12/2003 | Liebermann | 310/58 |

FOREIGN PATENT DOCUMENTS

| | | | | |
|---|---|---|---|---|
| EP | 1215800 A2 | * | 6/2002 | ........... H02K/3/487 |
| JP | 4-364343 A | | 12/1992 | |
| JP | 04364343 A | * | 12/1992 | ........... H02K/9/19 |
| JP | 2000-379791 A | | 6/2002 | |

* cited by examiner

Primary Examiner—Karl Tamai
Assistant Examiner—Yahveh Comas
(74) Attorney, Agent, or Firm—Shinjyu Global IP Counselors, LLP

(57) ABSTRACT

A stator for a rotary electric machine is provided to curb decreases in output caused by magnetic flux leakage. The stator has a stator core with stator coils that are wound around tooth parts of the stator core. The tooth parts of the stator core are arranged to form a rotational space with respect to a rotor, and housed inside the slots and cooling medium passages are formed inside the slots by blocking the openings of the slots. The protrusions are provided that protrude into the slots from both lateral surfaces of the tips of the tooth parts. The plates formed with grooves on both sides thereof that fit on the tips of the protrusions are arranged between adjacent ones of the protrusions so as to block the openings of the slots. A sealing member is formed on the rotor side of the plates.

16 Claims, 17 Drawing Sheets

(COMPARATIVE EXAMPLE)

STATOR STRUCTURE FOR ROTARY ELECTRIC MACHINE

BACKGROUND OF THE INVENTION

1. Field of the Invention

The present invention relates to a stator structure for a rotary electric machine or motor. More specifically, the present invention relates a rotary electric machine or motor having a stator structure that is designed to curb decreases in output caused by magnetic flux leakage.

2. Background Information

Examples of rotary electric machines or motors are disclosed in Japanese Laid-Open Patent Publication No. 4-364343 and Japanese Patent Application No. 2000-379791. In these publications, the rotary electric machines have stators with the stator slots (groove parts that house the coils) being used as cooling medium passages so that the coils can be cooled directly in order to cool the rotary electric machine efficiently.

In the rotary electric machine of Japanese Laid-Open Patent Publication No. 4-364343, molds are arranged adjacent an inner peripheral surface of the stator and located within the axial slots of the stator core, and then an engineering plastic material is injected to fill the space defined by the stator core and the molds. Once the plastic material has hardened, the slot openings in the stator core are blocked by the plastic material so that axial cooling medium passages are formed in the stator core.

Meanwhile, in the rotary electric machine of Japanese Patent Application No. 2000-379791, a seal is formed on the outer surfaces of the plates arranged near the openings of the slots by filling this area with resin. Since it is not necessary to remove the plates after forming the seal, the problem of the magnetic steel plates that constitute the stator core being turned up and the stator core being damaged is eliminated.

In this kind of structure, it is necessary to provide a stopper on the side of each of the plates closest to the slot in order to prevent leakage of resin when the seal is formed. By providing the stopper, a reliable seal can be achieved and dimension management and the manufacturing process ate simplified because movement of the plates can be restricted.

In view of the above, there exists a need for an improved stator structure for use with a rotary electric machine. This invention addresses this need in the art as well as other needs, which will become apparent to those skilled in the art from this disclosure.

SUMMARY OF THE INVENTION

It has been discovered in the method disclosed in Japanese Laid-Open Patent Publication No. 4-364343 that removal of the molds from the stator core sometimes causes damage to the stator core. In particular, after the engineering plastic has been hardened, it is necessary to remove the molds from the area inside of the stator core and the areas inside of the slots of the stator core. Therefore, when the molds are removed from the areas inside of the slots of the stator core, there is the possibility that the thin magnetic steel plates that constitute the stator core will be pulled and turned up by the molds, thus damaging the stator core.

It has been further discovered in the method described in Japanese Patent Application No. 2000-379791 that a suitably large stopper is required to ensure the strength of the plates, the strength of the stopper, and the prevention of leakage of the material forming the seal. Magnetic flux leakage sometimes occurs through this large stopper. When this magnetic flux leakage occurs, the rotary electric machine (e.g., electric motor) experiences a decrease in output and torque.

Therefore, one object of the present invention is to provide a stator structure for a rotary electric machine that suppresses the magnetic flux leakage caused by the aforementioned stopper part and delivers efficient output.

In accordance with one aspect of the present invention, a rotary electric machine is provided that basically comprises a machine housing, a rotor and a stator. The machine housing has an interior area with a coolant inlet port and a coolant outlet port. The rotor is rotatably coupled within the interior area of the machine housing. The stator is fixedly coupled within the interior area of the machine housing and disposed around the rotor. The stator basically comprises a stator core, a plurality of protrusions, a plurality of plates and a seal. The stator core includes a plurality of circumferentially spaced tooth parts forming a plurality of slots between adjacent pairs of the tooth parts. The tooth parts have tips that define openings of the slots. The protrusions protrude from both lateral surfaces of the tips of the tooth parts into the slots. The coils are wound onto the tooth parts of the stator core and extending through the slots. The plates have recesses on circumferential sides with the protrusions of the adjacent pairs of the tooth parts being located in the recesses of the plates to block the openings of the slots. The seal is formed between rotor facing sides of the plates and the tooth parts.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
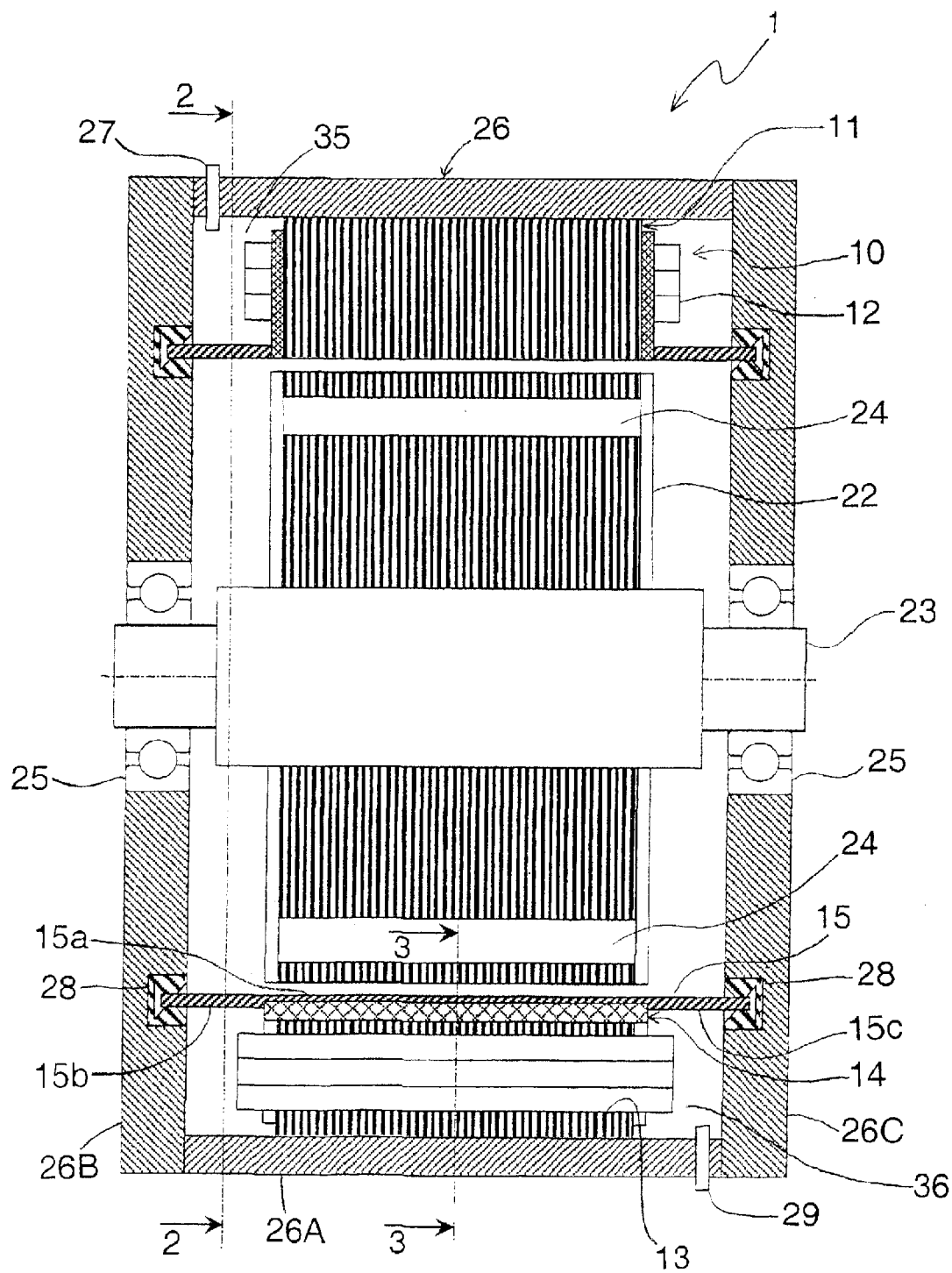
FIG. 1 is a longitudinal cross sectional view of a rotary electric machine or motor, as seen along section line 1—1 of FIG. 2, that is configured to use a stator core constructed in accordance with a first embodiment of the present invention.

Referring initially to FIG. 1, a rotary electric machine or motor 1 is illustrated in accordance with a first embodiment of the present invention. In the illustrated embodiments, the rotary electric machine 1 is a permanent magnet type synchronous electric motor. FIG. 1 shows a longitudinal cross sectional view of the rotary electric machine 1, while FIG. 2 shows a transverse cross sectional view of the rotary electric machine 1.

Figure 2:
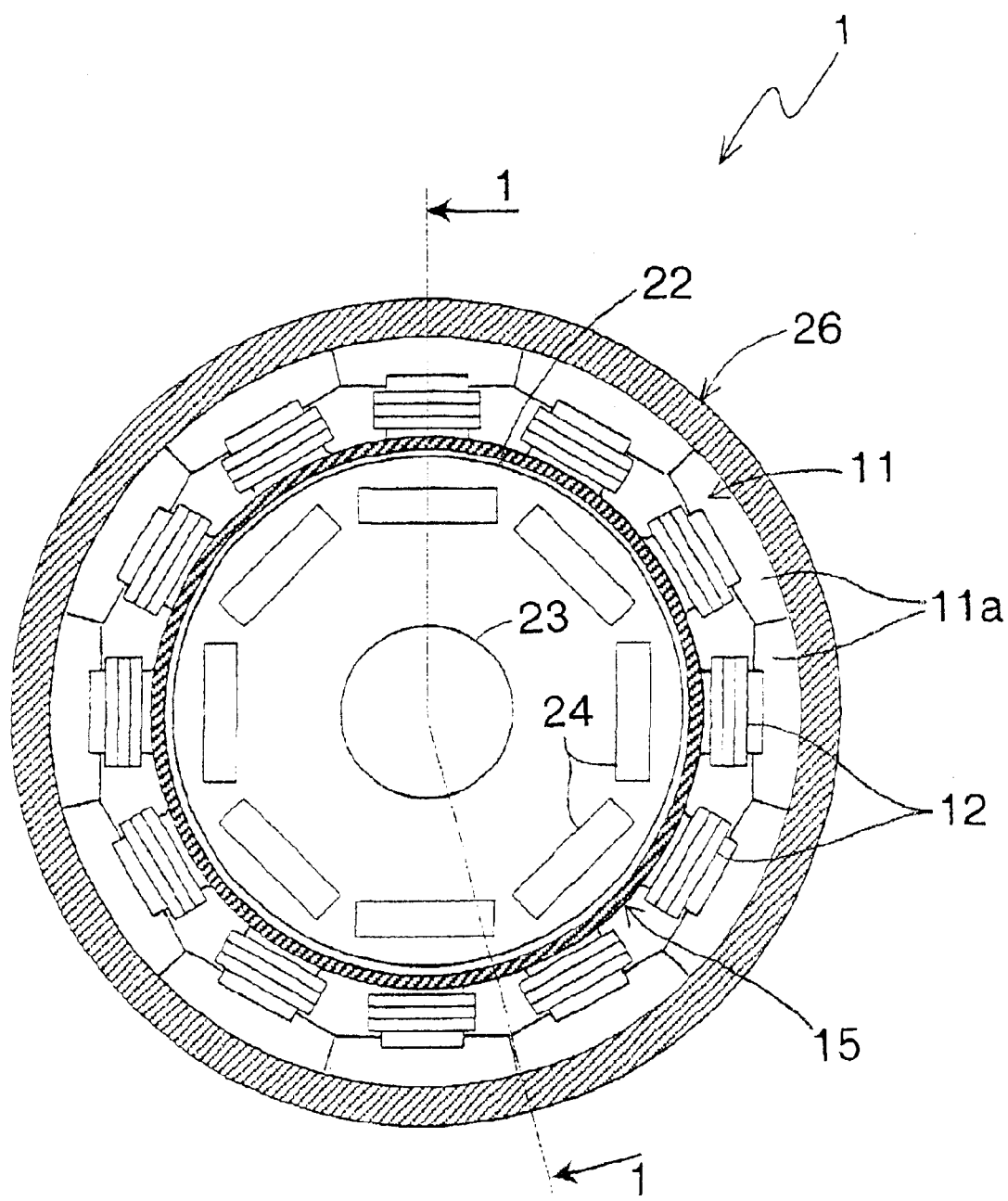
FIG. 2 is a transverse cross sectional view of the rotary electric motor illustrated in FIG. 1, as seen along section line 2—2 of FIG. 1, with a stator core and a rotor in accordance with the first embodiment of the present invention.

As seen in FIGS. 1 and 2, the rotary electric machine 1 includes a stator 10 that basically comprises a cylindrical stator core 11, a plurality of stator coils 12 wound through a plurality of slots 13 formed by the stator core 11. The stator core 11 further includes a plurality of installing plates 14 and a sealing member 15. The radial inner openings of the slots 13 are blocked by the plates 14 and sealed by the sealing member 15 as discussed below.

Preferably, the stator core 11 is formed by a plurality of identically shaped magnetic steel plates laminated or layered in the axial direction. In this embodiment, each of the magnetic steel plates of the stator core 11 is a divided structure instead of an integral structure. The stator 10 is configured to suppress the magnetic flux leakage and deliver efficient output as explained below.

The electric machine 1 basically comprises the stator 10 (briefly discussed above), a cylindrical rotor 22, a rotational shaft 23, a plurality (eight) of permanent magnets 24, a pair of bearings 25 and a machine case or housing 26. Although the electric machine 1 illustrated herein is a permanent magnet type synchronous electric motor, the present invention can also be applied to other motors, such as induction motors and SR motors. Furthermore, it will be apparent to those skilled in the art from this disclosure that although the stator 10 is used with an electric motor, the stator 10 can be used with other rotary electric machine such as a generator or motor/generator.

Figure 3:
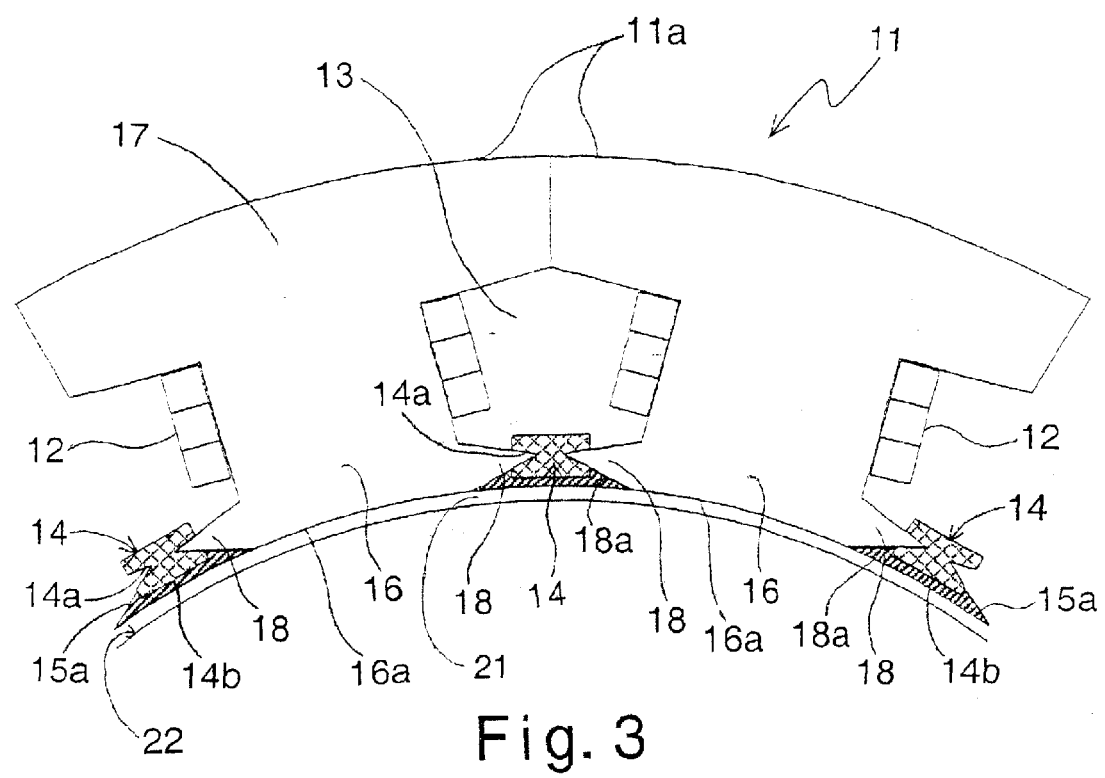
FIG. 3 is an enlarged partial schematic cross sectional view of the slots, tooth parts, and plates of the rotary electric motor illustrated in FIG. 1, as seen along section line 3—3 of FIG. 1, in accordance with the first embodiment of the present invention.

As shown in FIGS. 2 and 3, the stator core 11 is formed by a plurality of stator core sections 11a that are arranged in to form a cylinder or tubular member that surrounds the rotor 22. The stator core 11 is formed by a plurality of tooth parts 16 that extend inwardly in the radial direction from a ring-shaped or annular back core part 17 formed of twelve individual portions circumferentially arranged in the housing 26. As shown in FIG. 3, each of the stator core sections 11a includes one of the tooth parts 16 and a portion of the back core part 17. It is also acceptable for the stator core 11 to have integral structure, as seen in the later embodiments of the present invention, instead of a divided structure as illustrated in this first embodiment of the present invention.

The recessed spaces formed between adjacent the tooth parts 16 are the slots 13. The stator coils 12 are formed by winding coils onto the tooth parts 16 in a concentrated manner; Thus, the stator coils 12 are housed inside the slots 13. Since the slots 13 serve as cooling medium passages for passing cooling medium or oil through the stator core 11, the inner radial openings of the slots 13 are blocked by the plates 14. Additionally, the sealing member 15 is provided on the inside of the plates 14 to prevent leakage of the cooling medium from the slots 13 to the rotor 22.

A prescribed air gap or radial spacing 21 is provided between the inside surface of the stator core 11 and the outside surface of the rotor 22 so that the rotor 22 can rotate freely. The rotor 22, the rotational shaft 23, the permanent magnets 24, the bearings 25 and the machine housing 26 are relatively conventional components that are well known in the art. Since these components are well known in the art, the precise construction of these components will not be discussed or illustrated in detail herein.

The tooth parts 16 are located at equally spaced apart intervals with respect to the circumferential direction of the back core part 17. Preferably, the tooth parts 16 are substantially T-shaped that extend inwardly in a radial direction from the core part 17. The tooth parts 16 have curved radial inner surfaces 16a that are concentric with the outer surface of the rotor 22. In this embodiment, there are twelve of the tooth parts 16. However, it will be apparent to those skilled in the art from this disclosure that fewer or more of the tooth parts 16 can also be used as needed and/or desired. Thus, the present invention is not limited to any particular number of the tooth parts 16. The stator coils 12 are formed by winding coils around the girths of the tooth parts 16 through the slots 13 formed between the tooth parts 16.

The tips or inner radial ends of the tooth parts 16 have a pair of protrusions 18 extending in opposite circumferential directions from the curved radial inner surfaces 16a. In other words, the protrusions 18 are located on both of the circumferentially-facing sides of the tip of each of the tooth parts 16 and extend in opposite circumferential directions. Among these protrusions 18, the adjacent pairs of the protrusions 18 are disposed on adjacent ones of the tooth parts 16 to form the inner radial openings of the slots 13, which are blocked by the plates 14.

Preferably, each of the protrusions 18 decreases in the thickness as it approaches its free end. In other words, the protrusions 18 are tapered in the circumferential direction to pointed free ends. Thus, each of the protrusions 18 has a pair of inner rotor facing surfaces 18a that slant outwardly in the radial direction from the curved radial inner surfaces 16a toward the center of the slots 13. Thus, the sizes of the radial gaps between the protrusions 18 and the rotor 22 increases along the rotor facing surfaces 18a from the curved radial inner surfaces 16a toward the free ends of the protrusions 18.

The plates 14 are retained between the pointed free ends of adjacent pairs of the protrusions 18. Thus, the plates 14 are located in areas between the inside surface of the stator core 11 and the outside surface of the rotor 22 where the gap size is larger such that the sealing member 15 can be arranged on the bottom surface of the plates 14 without decreasing the prescribed air gap or radial spacing 21 between the inside surface of the stator core 11 and the outside surface of the rotor 22 so that the rotor 22 can rotate freely within the stator core 11.

Each of the plates 14 extends in the axial direction of the stator 10, and has a groove or recess 14a formed in the middle of both of its circumferentially facing sides. The opposed tips of adjacent pairs of the protrusions 18 fit into the grooves or recesses 14 a of the plates 14. Thus, the plates 14 are retained by a pair of adjacent protrusions 18 to the stator core 11. When the plates 14 are retained by adjacent pairs of opposed protrusions 18, the inner halves or portions of the plates 14 are located in the areas between the rotor facing surfaces 18a and the rotor 22 where the gaps between the tooth parts 16 become larger. Thus, the sealing member 15 can be disposed on the inner radial surfaces 14b of the plates 14 and be recessed or even with the inner surfaces 16a of the tooth parts 16 as explained below. Preferably, the radial inner surface of the sealing member 15 is curved and lies on the same curvature as the curved radial inner surfaces 16a of the tooth parts 16.

As best seen in FIG. 1, the sealing member 15 is preferably a one-piece unitary sealing member that is molded from a resin material onto an inner peripheral surface of the stator core 11. The sealing member 15 basically includes a plurality of axially extending center sealing sections 15a, a first cylindrical end sealing section 15b, and a second cylindrical end sealing section 15c. The end sealing sections 15b and 15c are annular seals that are attached to the housing 26 in a fluid tight manner. Thus, the sealing member 15 is coupled between the stator core 11 and the housing 26 to separate or divide. the housing 26 into an inner section containing the rotor 22 and an outer section containing the stator 10. The outer section of the housing 26 has a cooling medium or liquid flowing therethrough for cooling the stator 10 as discussed below in more detail.

As mentioned above, the sealing member 15 seals the plates 14 to the adjacent pairs of the tooth parts 16. In particular, the center sealing sections 15a of the sealing member 15 completely overlie the radial inner surface 14b of the plates 14 and portions of the rotor facing surfaces 18a of the protrusions 18. Accordingly, the fluid medium flowing through the cooling passages formed by the slots in the stator core 11 is prevented from leaking between the tooth parts 16 and the plates 14.

The sealing member 15 is formed by arranging molds on the inside and outside of the stator core 11 with the plates 14 being arranged in the openings of the slots 13, and then filling the molds with resin, for example, to obtain the plurality of axially extending center sections 15a and the pair of substantially cylindrical end sealing sections 15b and 15c. The existence of the plates 14 makes it unnecessary to insert a mold into the slots 13 and the problem of turning up the magnetic steel plates that form the stator core 11 can be avoided.

The detailed shapes of the slots 13, the tooth parts 16, and the plates 14, which serve to suppress magnetic flux leakage and form cooling passages that generate efficient output and torque, in this kind of electric machine 1 are shown in FIG. 3.

With this arrangement, the positions of the grooves 14a of the plates 14 are determined with respect to the tips of the protrusions 18 and the plates 14 are pressed radially outward by the filling force exerted on the bottom of the plates 14 when resin is injected to form the sealing member 15. Therefore, the plates 14 fit tightly against the rotor facing surfaces 18a of the protrusions 18 that face inwardly toward the rotor 22 such that resin leakage can be prevented. The grooves 14a are made slightly larger than the tips of the protrusions 18 so that the filling pressure will produce a reliably tight fit between the protrusions 18 and the plates 14. Resin leakage can be prevented without providing stopper parts as in the comparative example shown in FIG. 17, since the plates 14 are positioned in the cooling passages formed by the slots 13. Consequently, leakage of magnetic flux can be prevented and the output and torque of the electric machine 1 can be improved. Also, by slanting the rotor facing surfaces 18a of the tips of the protrusions 18 toward the outside of the electric machine 1 by an amount corresponding to the thickness of the center sections 15a of the sealing member 15 and the portions of the plates 14 (which protrude in the radially inward direction from the openings of the slots 13), the plates 14 and the sealing member 15 are prevented from protruding toward the rotor 22. Thus, the radial width of the air gap 21 is held substantially fixed between the plates 14 and the outer surface of the rotor 22. Consequently, the electric machine 1 can be manufactured with a stable output.

The housing 26 of the electric machine 1 comprises a cylindrical plate or tubular member 26A and a pair of side plates 26B and 26C. The side plates 26B and 26C are fixedly coupled to the cylindrical plate 26A so as to block the end openings at both axially facing ends of the cylindrical plate 26A. The cylindrical rotor 22 is concentrically housed inside the housing 26. Both ends of the rotational shaft 23 of the rotor 22 are rotatably supported on the side plates 26B and 26C, respectively, via the bearings 25 such that the rotor 22 can rotate freely within the housing 26. The housing 26 has an oil supply port 27, a pair of circular rubber seals 28, an oil discharge port 29. The oil supply port 27 and oil discharge port 29 are formed in the cylindrical plate 26A. The circular rubber seals 28 are fixed in recesses formed in the interior surfaces of the side plates 26B and 26C and receive the end sealing sections 15b and 15c, respectively, of the sealing member 15. The stator core 11 is arranged on the inside surface cylindrical plate 26A so as to surround the outside of the rotor 22.

Two cooling jackets 35 and 36, which comprise annular spaces, are formed between the axially facing ends of the stator core 11 and the inside of the housing 26. Cooling oil or medium is supplied to the cooling jacket 35 through the oil supply port 27 that passing through the cylindrical plate 26A. This cooling oil flows through the cooling medium passages (the slots 13 in FIG. 2) formed inside the stator core 11, and is directed to the cooling jacket 36 on the opposite side. The cooling oil is then discharged to the outside through the oil discharge port 29 that is formed in the cooling jacket 36 and passes through the cylindrical plate 26A.

In order to form the cooling jackets 35 and 36, the sealing member 15 is provided by molding resin so as to extend from both ends of the stator core 11 along an extension of the inner circumferential surface of the stator core 1. As previously discussed, the sealing member 15 is formed on the inner circumferential surface of the stator core 11 so as to form the substantially uniform air gap 21 with respect to the outside surface of the rotor 22. Meanwhile, the two end sealing sections 15b and 15c of the sealing member 15 extend to the side plates 26B and 26C of the housing 26 to form the annular spaces or cooling jackets 35 and 36 between the ends of the stator core 11 and the inside of the cylindrical plate 26A of the housing 26. Both of the end sealing sections 15b and 15c of the sealing member 15 are supported by the side plates 26B and 26C with the rubber seals 28 (see FIG. 1) disposed therebetween.

The cylindrical rotor 22 is arranged on the inside of the stator core 11, and the eight permanent magnets 24 are implanted inside the rotor 22. The eight permanent magnets 24 are spaced equally apart in the circumferential direction of the rotor 22. The force is generated by the magnetic field formed with the permanent magnets 24 and the current flowing in the stator coils 12, which are arranged in the stator core 11. This force is utilized to convert electrical energy into mechanical energy. While the number of permanent magnets 24 is illustrated as eight, it will be apparent to those skilled in the art from this disclosure that fewer or more of the permanent magnets 24 can also be used as needed and/or desired.

Figure 4:
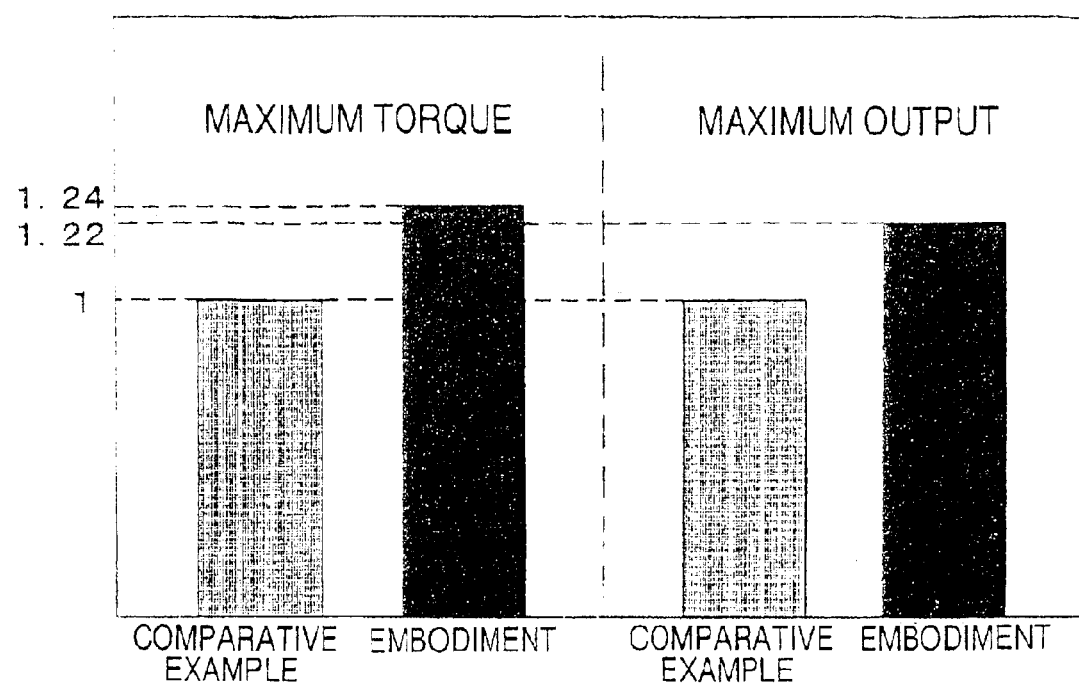
FIG. 4 is a bar graph showing a comparison of the torque and output of the rotary electric motor illustrated in FIG. 1 with a rotary electric motor (comparative example) having the construction shown in FIG. 17.
Figure 17:
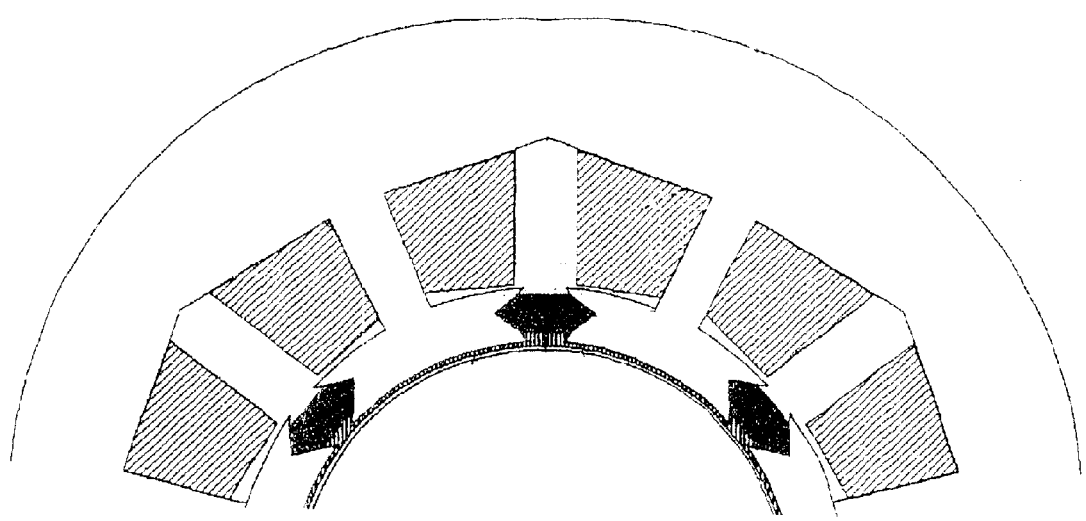
FIG. 17 is enlarged partial schematic cross sectional view, similar to FIG. 3, of a comparative example of a rotary electric motor with a stator structure in which the slots, tooth parts, and plates are not arranged in accordance with the present invention.

Referring now to FIG. 4, the rotary electric machine 1 with stator core 11 as seen in FIG. 3 has been compared to a rotary electric motor with a stator structure in which the slots, tooth parts, and plates (comparative example) are not arranged in accordance with the present invention as seen in FIG. 17. In particular, FIG. 4 is a bar graph that shows the results of an analysis of the maximum torque and maximum output of both the present invention of FIG. 3 and a comparative example of FIG. 17 in which the slots, tooth parts, and plates are not arranged in accordance with the present invention. The maximum torque and maximum output of the first embodiment (FIG. 3) are shown under the assumption that the values for the maximum torque and maximum output of the comparative example shown in FIG. 17 are equal to one (1) wherein the comparative example shown in FIG. 17 has the plates held within grooves formed in the tips of the protrusions. The results show clearly that the output and torque both increase in the present invention of FIG. 3 in comparison with the comparative example shown in FIG. 17 when the grooves 14a are provided in the middle of both circumferentially facing sides of the plates 14 and the rotor facing surfaces 18a of the protrusions 18 of the stator core 11 are slanted toward the outside of the rotary electric machine 1.

Second Embodiment

Figure 5:
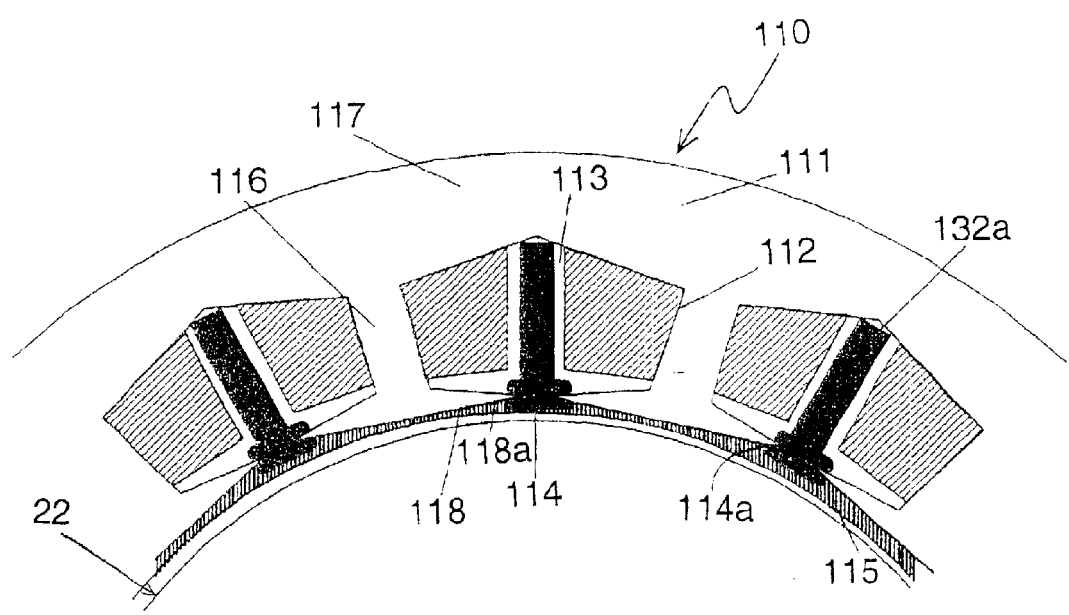
FIG. 5 is an enlarged partial schematic cross sectional view, similar to FIG. 3, of the slots, tooth parts, and plates of a rotary electric motor in accordance with a second embodiment of the present invention.

Referring now to FIG. 5, a modified stator 110 in accordance with a second embodiment will now be explained. The modified stator 110 replaces the stator 10 of the electric machine 1 illustrated in FIG. 1. Thus, the modified stator 110 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The stator 110 basically comprises a cylindrical stator core 111, a plurality of stator coils 112 wound through a plurality of slots 113 formed by the stator core 111. The stator core 111 further includes a plurality of installing plates 114 and a sealing member 115. Preferably, the stator core 111 is formed by a plurality of identically shaped magnetic steel plates laminated or layered in the axial direction relative to the rotation of the rotor 22. In this second embodiment, each of the magnetic steel plates of the stator core 111 is an integral structure instead of a divided structure as in the first embodiment. The stator core 111 is formed by a plurality of tooth parts 116 that extend inwardly in the radial direction from a ring-shaped back core part 117. The tooth parts 116 are located at equally spaced apart intervals with respect to the circumferential direction of the back core part 117. The tooth parts 116 have a pair of protrusions 118 with their rotor facing surfaces 118a slanted outwardly in the radial direction, similar to the first embodiment, but not as steep as in the first embodiment.

Similarity to the first embodiment, each of the circumferentially facing sides of the plates 114 has a groove or recess 114a that receives one of the protrusions 118 of the tips of the tooth parts 116. Thus, the plates 114 block the openings of the slots 113. However, each of the plate 114 is provided with a radially extended leg part 132a that extends far enough in the radial direction to contact the back core part 117 inside the slot 113. The extended leg parts 132a are narrower than the distances between adjacent pairs of the stator coils 112. Thus, the leg parts 132a do not contact adjacent pairs of the stator coils 112, and thus, maintaining the cooling medium passages of the stator coils 112. This arrangement does not change the contact surface area between the cooling medium that passes through the inside of the slots 113 and the stator coils 112 (which reach the highest temperatures). Rather, this arrangement merely narrows the flow passage or the slots 113, since the extended leg part 132a narrows are arranged in a non-contacting manner between the coils 112. Consequently, the flow speed of the cooling medium that passes through the inside of the slots 113 can be increased without changing the surface area over which the cooling medium contacts the coils 113 and the cooling performance can be improved. In other words, it is possible to increase the flow speed and improve the cooling performance by using the plates 114 instead of the plates 14.

Third Embodiment

Figure 6:
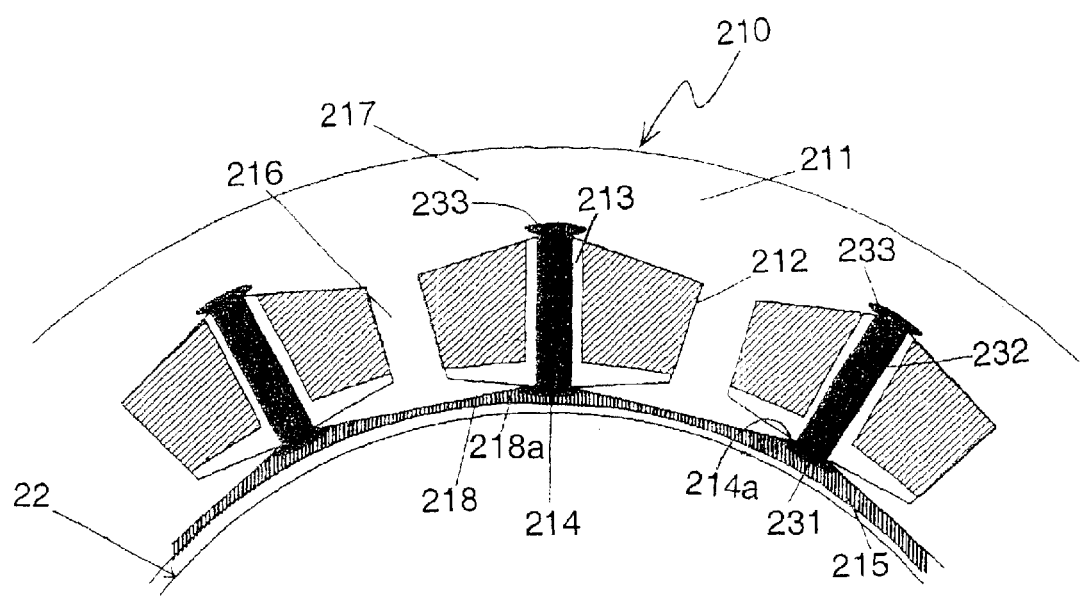
FIG. 6 is an enlarged partial schematic cross sectional view, similar to FIG. 3, of the slots, tooth parts, and plates of a rotary electric motor in accordance with a third embodiment of the present invention.
Figure 7:
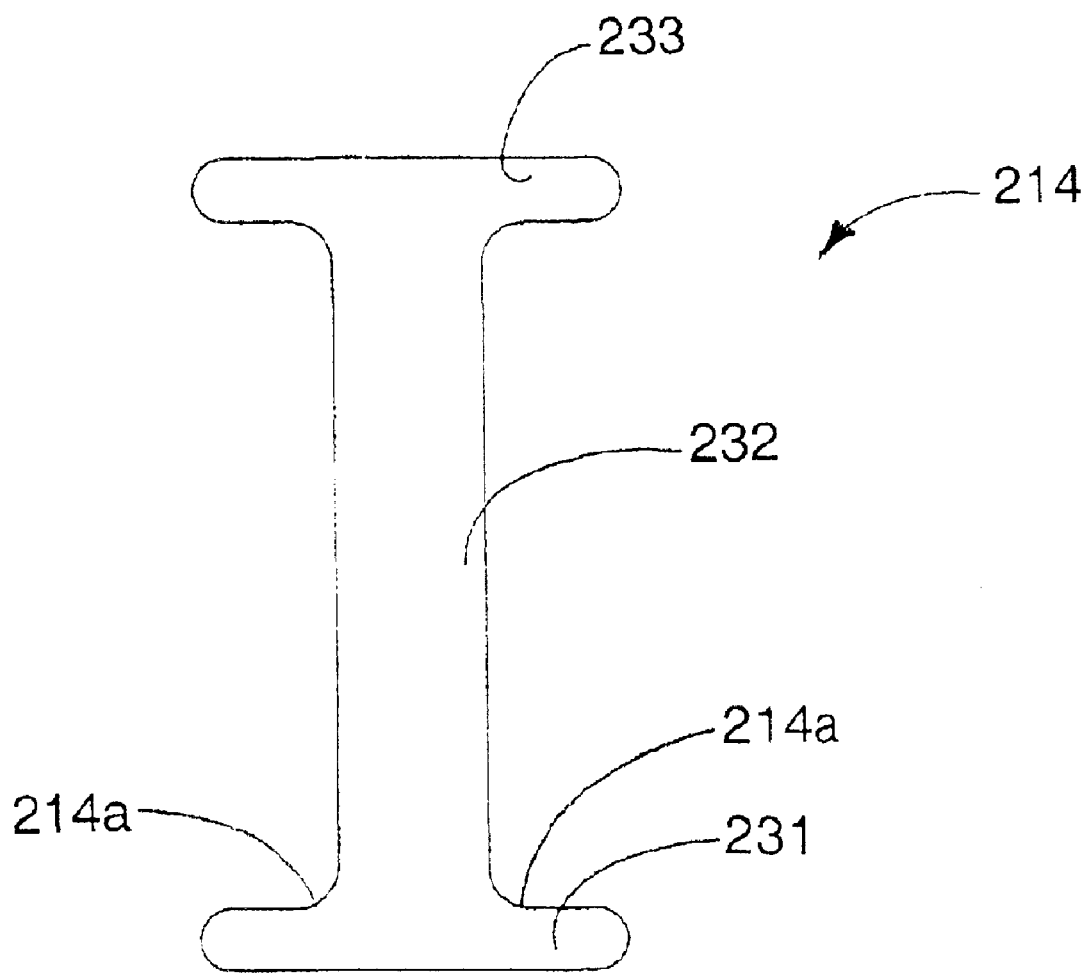
FIG. 7 is an enlarged elevational view of one of the plates used in the rotary electric motor in accordance with the third embodiment of the present invention illustrated in FIG. 6.

Referring now to FIGS. 6 and 7, a modified stator 210 in accordance with a third embodiment will now be explained. The modified stator 210 replaces the stator 10 of the electric machine 1 illustrated in FIG. 1. Thus, the modified stator 210 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first, second and third embodiments, the parts of the third embodiment that are identical to the parts of the first embodiment will be given the same reference numerals as the parts of the first embodiment. Moreover, the descriptions of the parts of the third embodiment that are identical to the parts of the first and second embodiments may be omitted for the sake of brevity.

The stator 210 basically comprises a cylindrical stator core 211, a plurality of stator coils 212 wound through a plurality of slots 213 formed by the stator core 211. The stator core 211 further includes a plurality of installing plates 214 and a sealing member 215. Preferably, the stator core 211 is formed by a plurality of identically shaped magnetic steel plates laminated or layered in the axial direction relative to the rotation of the rotor 22. In this third embodiment, each of the magnetic steel plates of the stator core 211 is an integral structure instead of a divided structure as in the first embodiment. The stator core 211 is formed by a plurality of tooth parts 216 that extend inwardly in the radial direction from a ring-shaped back core part 217. The tooth parts 216 are located at equally spaced apart intervals with respect to the circumferential direction of the back core part 217. The tooth parts 216 have a pair of protrusions 218 with their rotor facing surfaces 218a slanted outwardly in the radial direction, similar to the first embodiment, but not as steep as in the first embodiment.

As best seen in FIG. 7, each of the plates 214 is formed in an "I" shape comprising: a main body 231, a leg part 232, and a holding part 233. The main body 231 is wider in the circumferential direction than the opening of the slot 213. The main body 231 is disposed on the inner radial sides of the protrusions 218. Each of the main bodies 231 231 has a pair of surfaces 214a that contacts two of the rotor facing surfaces 218a on the inner radial sides of the tips of adjacent pairs of the protrusion 218 that faces the rotor 22. The surfaces 214a are parts of large recesses or grooves formed on opposite sides of the leg part 232. Thus, each of the main body 231 blocks one of the inner radial openings of one of the slots 213.

The leg parts 232 are formed slightly narrower than the openings of the slots 213 and are disposed between adjacent pairs of the stator coils 212. The leg parts 232 are arranged such that they do not contact the stator coils 212 such that passages can be maintained for a cooling medium that cools the stator coils 212.

The holding part 233 (on outside of the plate 214) is wider than the leg part 232 in the circumferential direction of the stator 210 and is held in a groove or recess formed in the back core part 217.

By holding the plates 214 at the back core part 217, the plates 214 can be retained such that they do not contact the radially outwardly facing surfaces of the protrusions 218. Thus, the contact area between the protrusions 218 and the cooling medium can be increased. Thus, the cooling of the protrusions 218 of the tooth parts 216, which reach the highest temperatures after the stator coils 212, can also be improved. Similarly to the second embodiment, by extending the plates 214 into the slots 213 does not change the contact surface area between the cooling medium and the stator coils 212 but merely narrows the flow passage. Therefore, it is possible to increase the flow speed and improve the cooling performance. Furthermore, since this structure supports the plates 214 vertically inside the slots 213, the positioning precision of the plates 214 within the slots 213 is improved.

Fourth Embodiment

Figure 8:
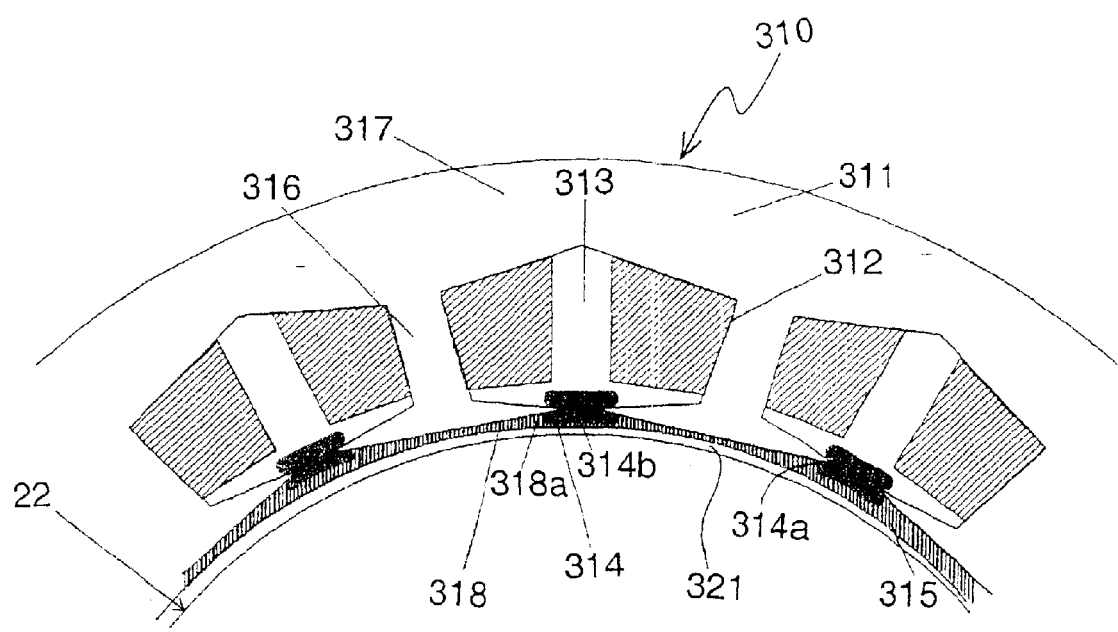
FIG. 8 is an enlarged partial schematic cross sectional view, similar to FIG. 3, of the slots, tooth parts, and plates of a rotary electric motor in accordance with a fourth embodiment of the present invention.

Referring now to FIG. 8, a modified stator 310 in accordance with a fourth embodiment will now be explained. The modified stator 310 replaces the stator 10 of the electric machine 1 illustrated in FIG. 1. Thus, the modified stator 310 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The stator 310 that basically comprises a cylindrical stator core 311, a plurality of stator coils 312 wound through a plurality of slots 313 formed by the stator core 311. The stator core 311 further includes a plurality of installing plates 314 and a sealing member 315. Preferably, the stator core 311 is formed by a plurality of identically shaped magnetic steel plates laminated or layered in the axial direction relative to the rotation of the rotor 22. The stator core 311 is formed by a plurality of tooth parts 316 that extend inwardly in the radial direction from a ring-shaped back core part 317. The tooth parts 316 are located at equally spaced apart intervals with respect to the circumferential direction of the back core part 317. The tooth parts 316 have a pair of protrusions 318 with their rotor facing surfaces 318a slanted outwardly in the radial direction, similar to the first embodiment, but not as steep as in the first embodiment.

In this embodiment, the plates 314 are substantially the same as the plates 14 in the first embodiment, except that the rotor facing surfaces 314b, which face the rotor 22, are each formed with a circular arc shape that is concentric to the rotor 22. This arrangement causes the distance between the rotor 22 and the plates 314, i.e., the width of the air gap 321, to be fixed. Consequently, the thickness of the sealing member 315 over the plates 314 can be made uniform and the strength of the sealing member 315 can be improved. Also, the plates 314 can bear pressure uniformly, thus improving their durability.

Fifth Embodiment

Figure 9:
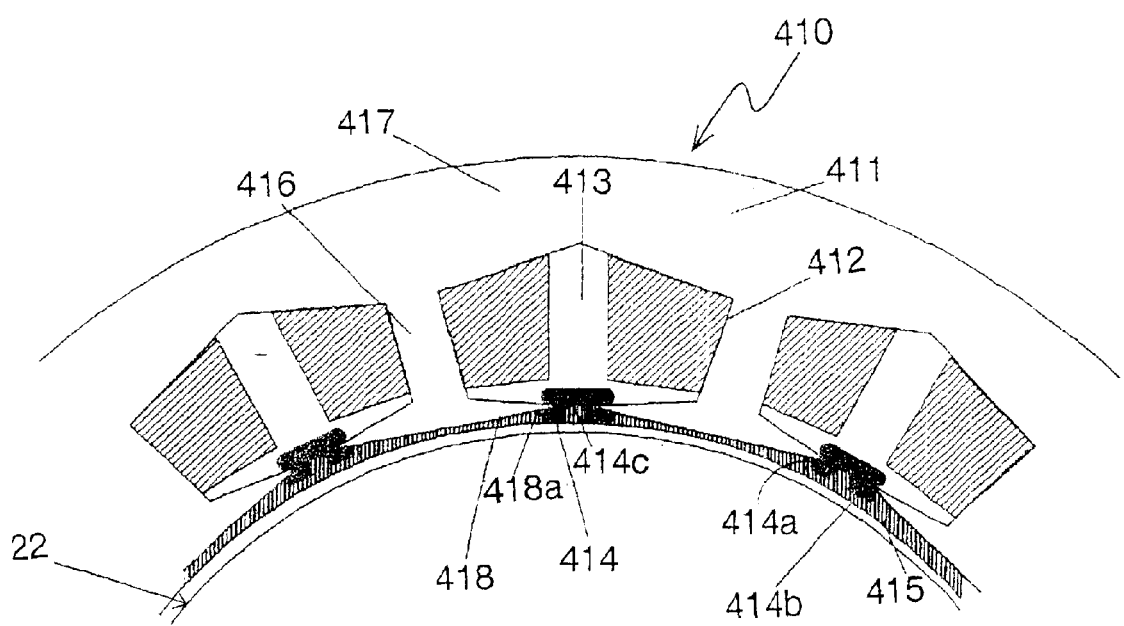
FIG. 9 is an enlarged partial schematic cross sectional view, similar to FIG. 3, of the slots, tooth parts, and plates of a rotary electric motor in accordance with a fifth embodiment of the present invention.

Referring now to FIG. 9, a modified stator 410 in accordance with a fifth embodiment will now be explained. The modified stator 410 replaces the stator 10 of the electric machine 1 illustrated in FIG. 1. Thus, the modified stator 410 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The stator 410 that basically comprises a cylindrical stator core 411, a plurality of stator coils 412 wound through a plurality of slots 413 formed by the stator core 411. The stator core 411 further includes a plurality of installing plates 414 and a sealing member 415. Preferably, the stator core 411 is formed by a plurality of identically shaped magnetic steel plates laminated or layered in the axial direction relative to the rotation of the rotor 22. The stator core 411 is formed by a plurality of tooth parts 416 that extend inwardly in the radial direction from a ring-shaped back core part 417. The tooth parts 416 are located at equally spaced apart intervals with respect to the circumferential direction of the back core part 417. The tooth parts 416 have a pair of protrusions 418 with their rotor facing surfaces 418a slanted outwardly in the radial direction, similar to the first embodiment, but not as steep as in the first embodiment.

In this embodiment, the plates 414 are substantially the same as the plates 14 in the first embodiment, except that each of the plates 414 has a rotor facing surface 414b with a plate groove or recess 414c that extends in the axial direction of the rotor 22. The plate grooves or recess 414c are provided in the middle of each plate surface that faces the rotor 22. The resin used to form the sealing member 415 is located in each of the plate grooves or recesses 414. In other words, the insides of the plate grooves or recesses 414 are filled with a portion of the sealing member 415. As a result, the strength of the sealing member 415 can be improved and movement of the sealing member 415 can be prevented.

Sixth Embodiment

Figure 10:
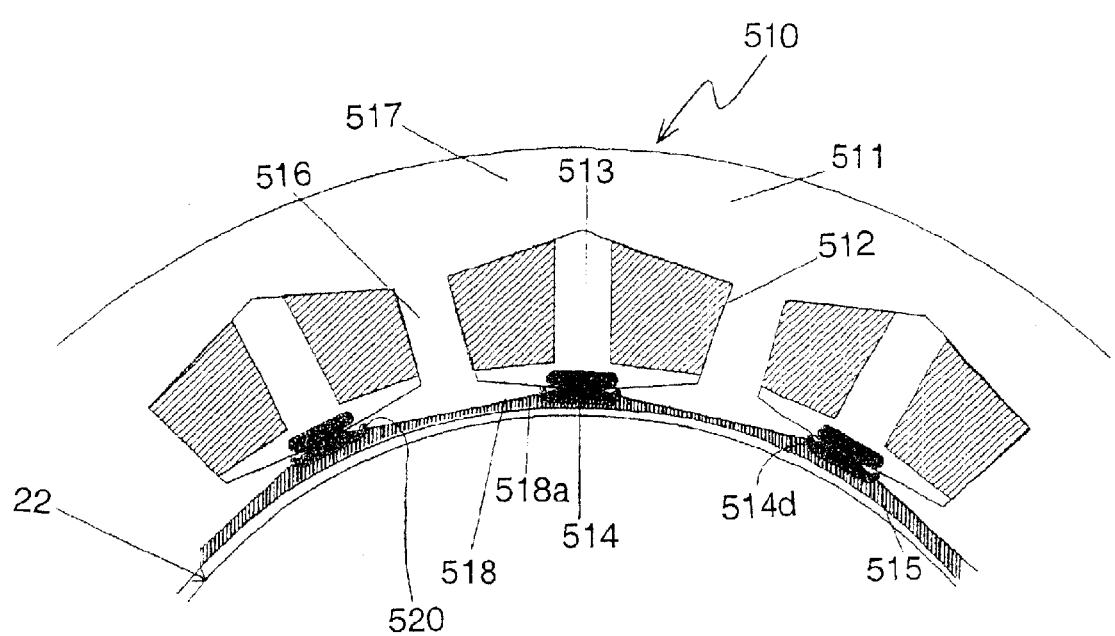
FIG. 10 is an enlarged partial schematic cross sectional view, similar to FIG. 3, of the slots, tooth parts, and plates of a rotary electric motor in accordance with a sixth embodiment of the present invention.

Referring now to FIG. 10, a modified stator 510 in accordance with a sixth embodiment will now be explained. The modified stator 510 replaces the stator 10 of the electric machine 1 illustrated in FIG. 1. Thus, the modified stator 510 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The stator 510 that basically comprises a cylindrical stator core 511, a plurality of stator coils 512 wound through a plurality of slots 513 formed by the stator core 511. The stator core 511 further includes a plurality of installing plates 514 and a sealing member 515. Preferably, the stator core 511 is formed by a plurality of identically shaped magnetic steel plates laminated or layered in the axial direction relative to the rotation of the rotor 22. The stator core 511 is formed by a plurality of tooth parts 516 that extend inwardly in the radial direction from a ring-shaped back core part 517. The tooth parts 516 are located at equally spaced apart intervals with respect to the circumferential direction of the back core part 517. The tooth parts 516 have a pair of protrusions 518 with their rotor facing surfaces 518a slanted outwardly in the radial direction, similar to the first embodiment, but not as steep as in the first embodiment.

This sixth embodiment is substantially the same as the first embodiment, except that the protrusions 518 of the tooth parts 516 are each provided with a grooves or recesses 520 that run in the axial direction along the rotor facing surfaces 518a that faces the rotor 22, and that the plates 514 are shaped such that their tips 514d on the side thereof that faces the rotor 22 are hook-shaped and fit into the grooves or recesses 520. This arrangement improves the coupling performance between the plates 514 and the protrusions 518.

Seventh Embodiment

Figure 11:
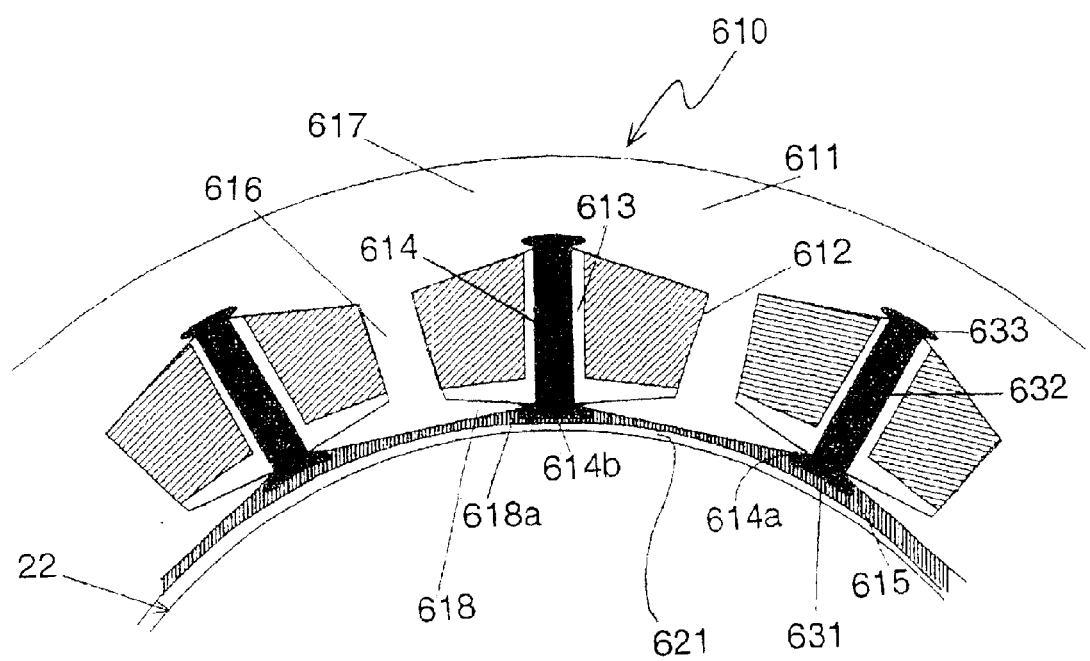
FIG. 11 is an enlarged partial schematic cross sectional view, similar to FIG. 3, of the slots, tooth parts, and plates of a rotary electric motor in accordance with a seventh embodiment of the present invention.
Figure 12:
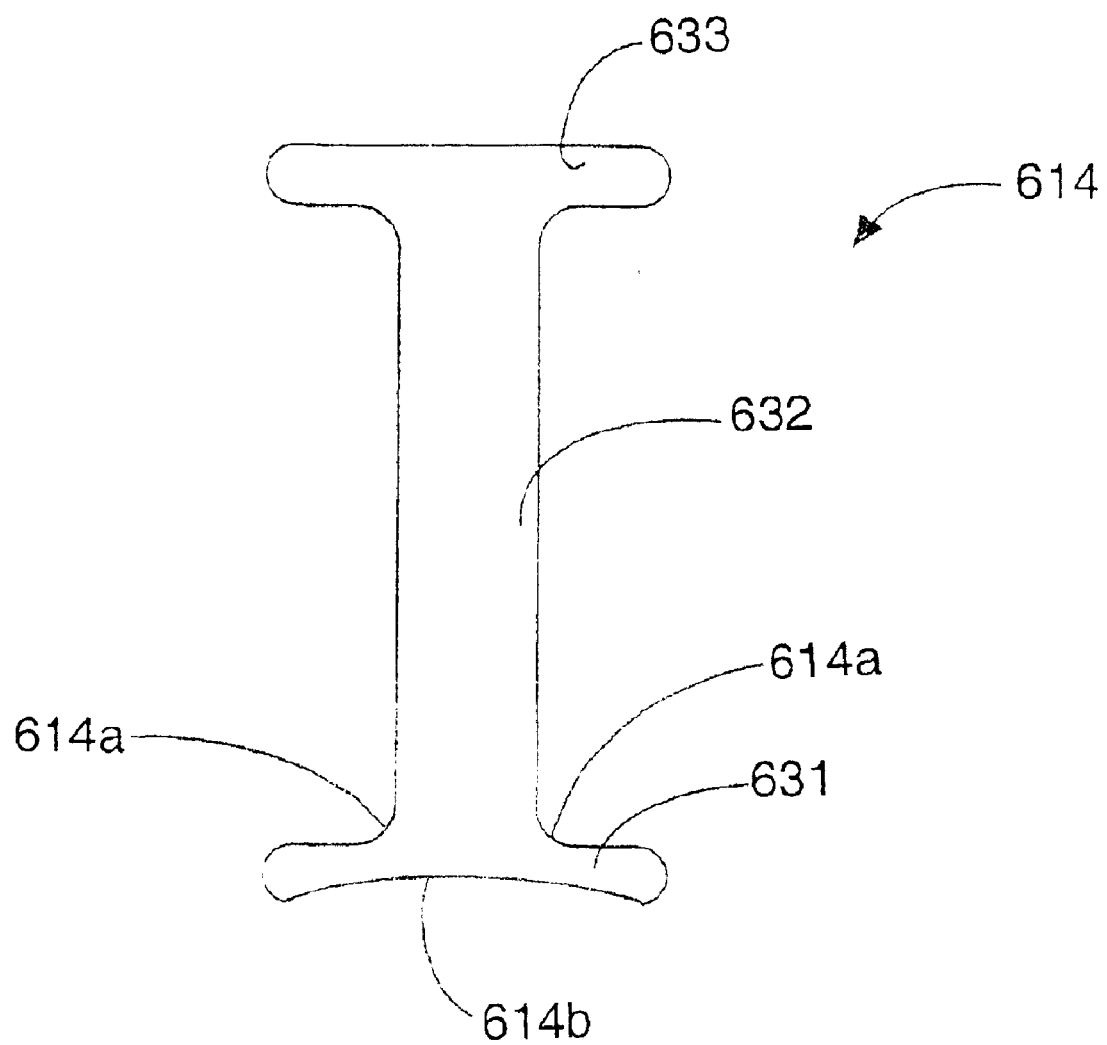
FIG. 12 is an enlarged elevational view of one of the plates used in the rotary electric motor in accordance with the seventh embodiment of the present invention illustrated in FIG. 11.

Referring now to FIGS. 11 and 12, a modified stator 610 in accordance with a seventh embodiment will now be explained. The modified stator 610 replaces the stator 10 of the electric machine 1 illustrated in FIG. 1. Thus, the modified stator 610 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first, third, fourth and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first, third, fourth and seventh embodiments may be omitted for the sake of brevity.

The stator 610 basically comprises a cylindrical stator core 611, a plurality of stator coils 612 wound through a plurality of slots 613 formed by the stator core 611. The stator core 611 further includes a plurality of installing plates 614 and a sealing member 615. Preferably, the stator core 611 is formed by a plurality of identically shaped magnetic steel plates laminated or layered in the axial direction relative to the rotation of the rotor 22. In this seventh embodiment, each of the magnetic steel plates of the stator core 611 is an integral structure instead of a divided structure as in the first embodiment. The stator core 611 is formed by a plurality of tooth parts 616 that extend inwardly in the radial direction from a ring-shaped back core part 617. The tooth parts 616 are located at equally spaced apart intervals with respect to the circumferential direction of the back core part 617. The tooth parts 616 have a pair of protrusions 618 with their rotor facing surfaces 618a slanted outwardly in the radial direction, similar to the first embodiment, but not as steep as in the first embodiment.

As best seen in FIG. 12, each of the plates 614 is formed in an "I" shape comprising: a main body 631, a leg part 632, and a holding part 633. The main body 631 is wider in the circumferential direction than the opening of the slot 613. The main body 631 is disposed on the inner radial sides of the protrusions 618. Each of the main bodies 631 has a pair of surfaces 614a that contacts two of the rotor facing surfaces 618a on the inner radial sides of the tips of adjacent pairs of the protrusion 618 that faces the rotor 22. The surfaces 614a are parts of large recesses or grooves formed on opposite sides of the leg part 632. Thus, each of the main body 631 blocks one of the inner radial openings of one of the slots 613.

The leg parts 632 are formed slightly narrower than the openings of the slots 613 and are disposed between adjacent pairs of the stator coils 612. The leg parts 632 are arranged such that they do not contact the stator coils 612 such that passages can be maintained for a cooling medium that cools the stator coils 612.

The holding part 633 (on outside of the plate 614) is wider than the leg part 632 in the circumferential direction of the stator 610 and is held in a groove or recess formed in the back core part 617.

In this embodiment, the plates 614 are substantially the same as the plates 214 in the third embodiment, except that the rotor facing surfaces 614b. The rotor facing surfaces 614b face the rotor 22 and are each formed with a circular arc shape that is concentric to the rotor 22, similar to the rotor facing surfaces 314b of the fourth embodiment. This arrangement causes the distance between the rotor 22 and the plates 614, i.e., the width of the air gap 621, to be fixed. Consequently, the thickness of the sealing member 615 over the plates 614 can be made uniform and the strength of the sealing member 615 can be improved. Also, the plates 614 can bear pressure uniformly, thus improving their durability.

By holding the plates 614 at the back core part 617, the plates 614 can be retained such that they do not contact the radially outwardly facing surfaces of the protrusions 618. Thus, the contact area between the protrusions 618 and the cooling medium can be increased. Thus, the cooling of the protrusions 618 of the tooth parts 616, which reach the highest temperatures after the stator coils 612, can also be improved. Similarly to the second embodiment, by extending the plates 614 into the slots 613 does not change the contact surface area between the cooling medium and the stator coils 612 but merely narrows the flow passage. Therefore, it is possible to increase the flow speed and improve the cooling performance. Furthermore, since this structure supports the plates 614 vertically inside the slots 613, the positioning precision of the plates 614 within the slots 613 is improved.

Eighth Embodiment

Figure 13:
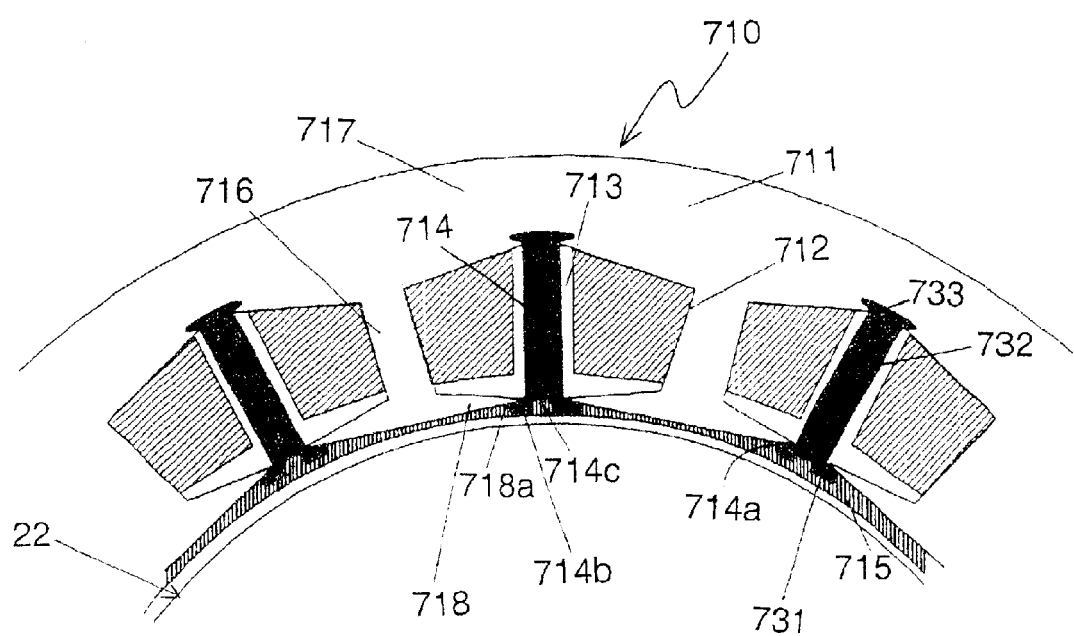
FIG. 13 is an enlarged partial schematic cross sectional view, similar to FIG. 3, of the slots, tooth parts, and plates of a rotary electric motor in accordance with a eighth embodiment of the present invention.
Figure 14:
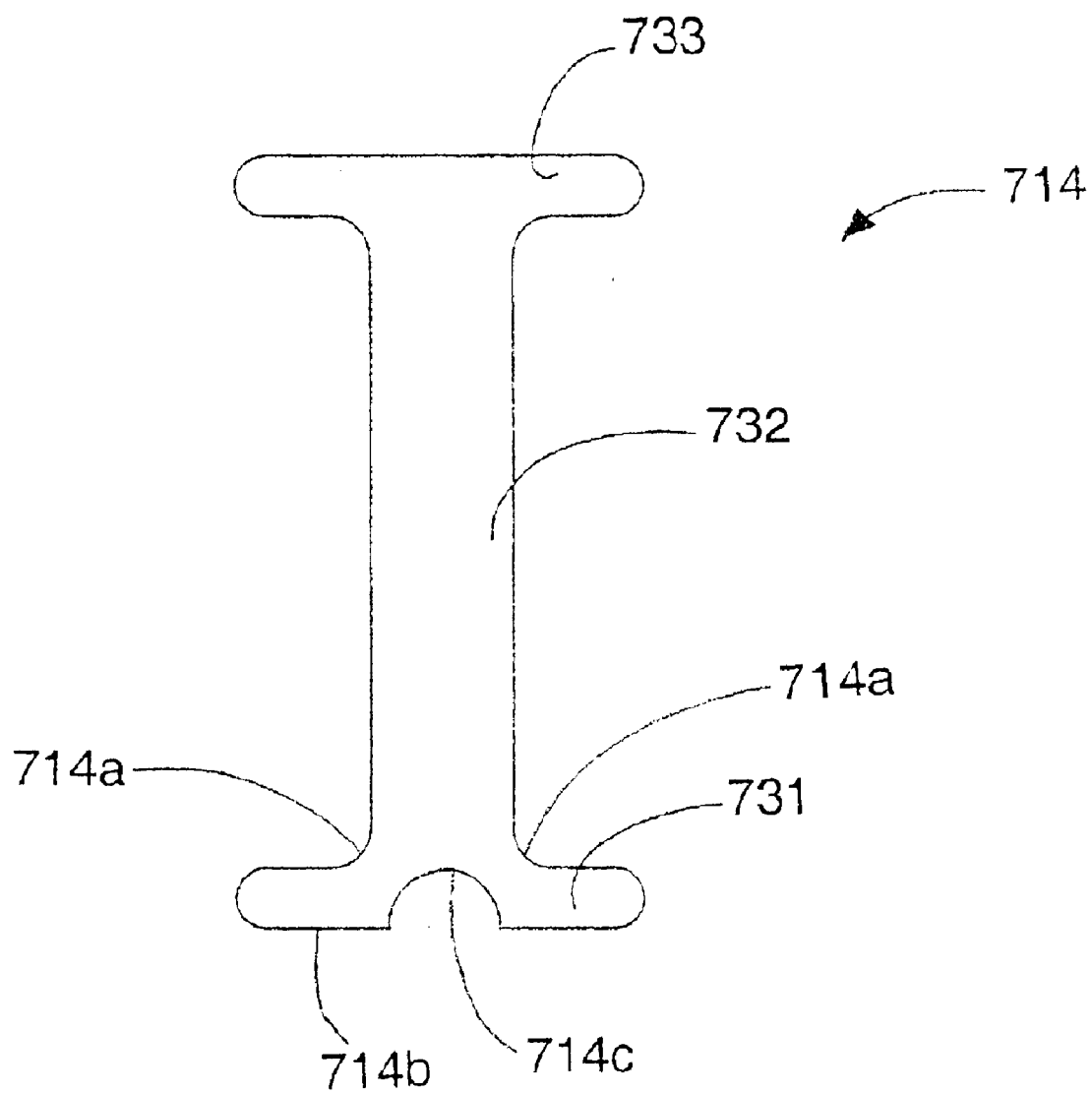
FIG. 14 is an enlarged elevational view of one of the plates used in the rotary electric motor in accordance with the eighth embodiment of the present invention illustrated in FIG. 13.

Referring now to FIGS. 13 and 14, a modified stator 710 in accordance with a eighth embodiment will now be explained. The modified stator 710 replaces the stator 10 of the electric machine 1 illustrated in FIG. 1. Thus, the modified stator 710 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first, third, fifth and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first, third, fifth and eighth embodiments may be omitted for the sake of brevity.

The stator 710 basically comprises a cylindrical stator core 711, a plurality of stator coils 712 wound through a plurality of slots 713 formed by the stator core 711. The stator core 711 further includes a plurality of installing plates 714 and a sealing member 715. Preferably, the stator core 711 is formed by a plurality of identically shaped magnetic steel plates laminated or layered in the axial direction relative to the rotation of the rotor 22. In this eighth embodiment, each of the magnetic steel plates of the stator core 711 is an integral structure instead of a divided structure as in the first embodiment. The stator core 711 is formed by a plurality of tooth parts 716 that extend inwardly in the radial direction from a ring-shaped back core part 717. The tooth parts 716 are located at equally spaced apart intervals with respect to the circumferential direction of the back core part 717. The tooth parts 716 have a pair of protrusions 718 with their rotor facing surfaces 718a slanted outwardly in the radial direction, similar to the first embodiment, but not as steep as in the first embodiment.

As best seen in FIG. 14, each of the plates 714 is formed in an "I" shape comprising: a main body 731, a leg part 732, and a holding part 733. The main body 731 is wider in the circumferential direction than the opening of the slot 713. The main body 731 is disposed on the inner radial sides of the protrusions 718. Each of the main bodies 731 has a pair of surfaces 714a that contacts two of the rotor facing surfaces 718a on the inner radial sides of the tips of adjacent pairs of the protrusion 718 that faces the rotor 22. The surfaces 714a are parts of large recesses or grooves formed on opposite sides of the leg part 732. Thus, each of the main body 731 blocks one of the inner radial openings of one of the slots 713.

The leg parts 732 are formed slightly narrower than the openings of the slots 713 and are disposed between adjacent pairs of the stator coils 712. The leg parts 732 are arranged such that they do not contact the stator coils 712 such that passages can be maintained for a cooling medium that cools the stator coils 712.

The holding part 733 (on outside of the plate 714) is wider than the leg part 732 in the circumferential direction of the stator 710 and is held in a groove or recess formed in the back core part 717.

In this embodiment, the plates 714 are substantially the same as the plates 214 in the third embodiment, except that each of the plates 714 has a rotor facing surface 714b with a plate groove or recess 714c that extends in the axial direction of the rotor 22, similar to the grooves or recesses 414c of the fifth embodiment. The plate grooves or recess 714c are provided in the middle of each plate surface that faces the rotor 22. The resin used to form the sealing member 715 is located in each of the plate grooves or recesses 714c. In other words, the insides of the plate grooves or recesses 714c are filled with a portion of the sealing member 715. As a result, the strength of the sealing member 715 can be improved and movement of the sealing member 715 can be prevented.

By holding the plates 714 at the back core part 717, the plates 714 can be retained such that they do not contact the radially outwardly facing surfaces of the protrusions 718. Thus, the contact area between the protrusions 718 and the cooling medium can be increased. Thus, the cooling of the protrusions 718 of the tooth parts 716, which reach the highest temperatures after the stator coils 712, can also be improved. Similarly to the second embodiment, by extending the plates 714 into the slots 713 does not change the contact surface area between the cooling medium and the stator coils 712 but merely narrows the flow passage. Therefore, it is possible to increase the flow speed and improve the cooling performance. Furthermore, since this structure supports the plates 714 vertically inside the slots 713, the positioning precision of the plates 714 within the slots 713 is improved.

Ninth Embodiment

Figure 15:
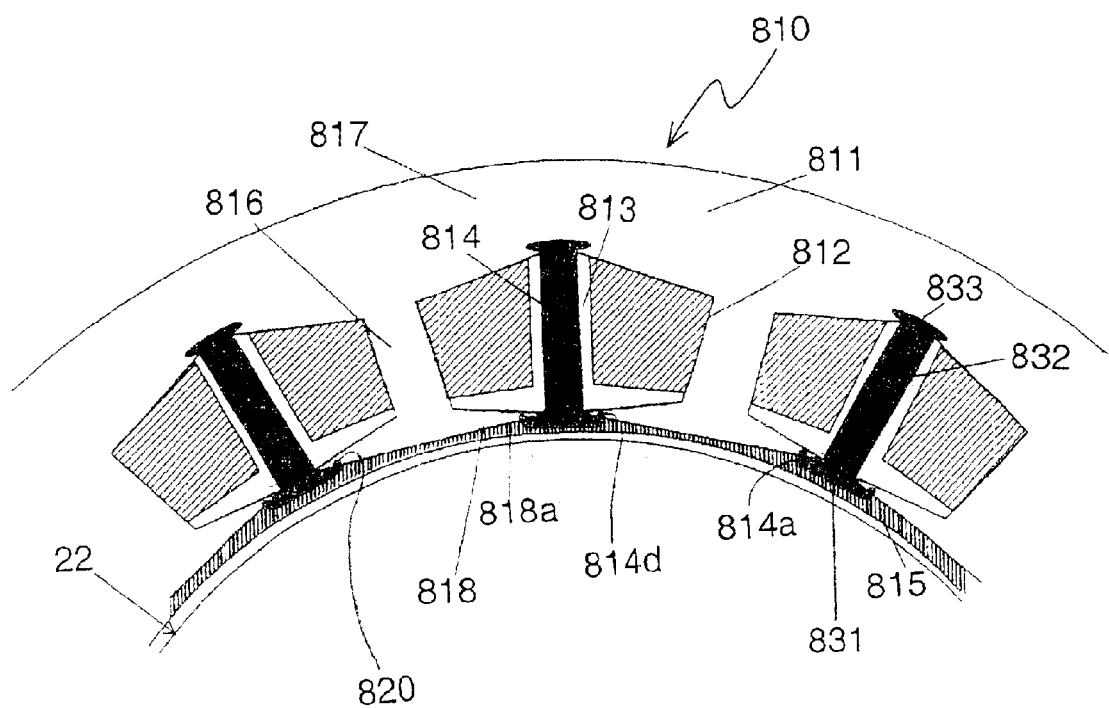
FIG. 15 is an enlarged partial schematic cross sectional view, similar to FIG. 3, of the slots, tooth parts, and plates of a rotary electric motor in accordance with a ninth embodiment of the present invention.
Figure 16:
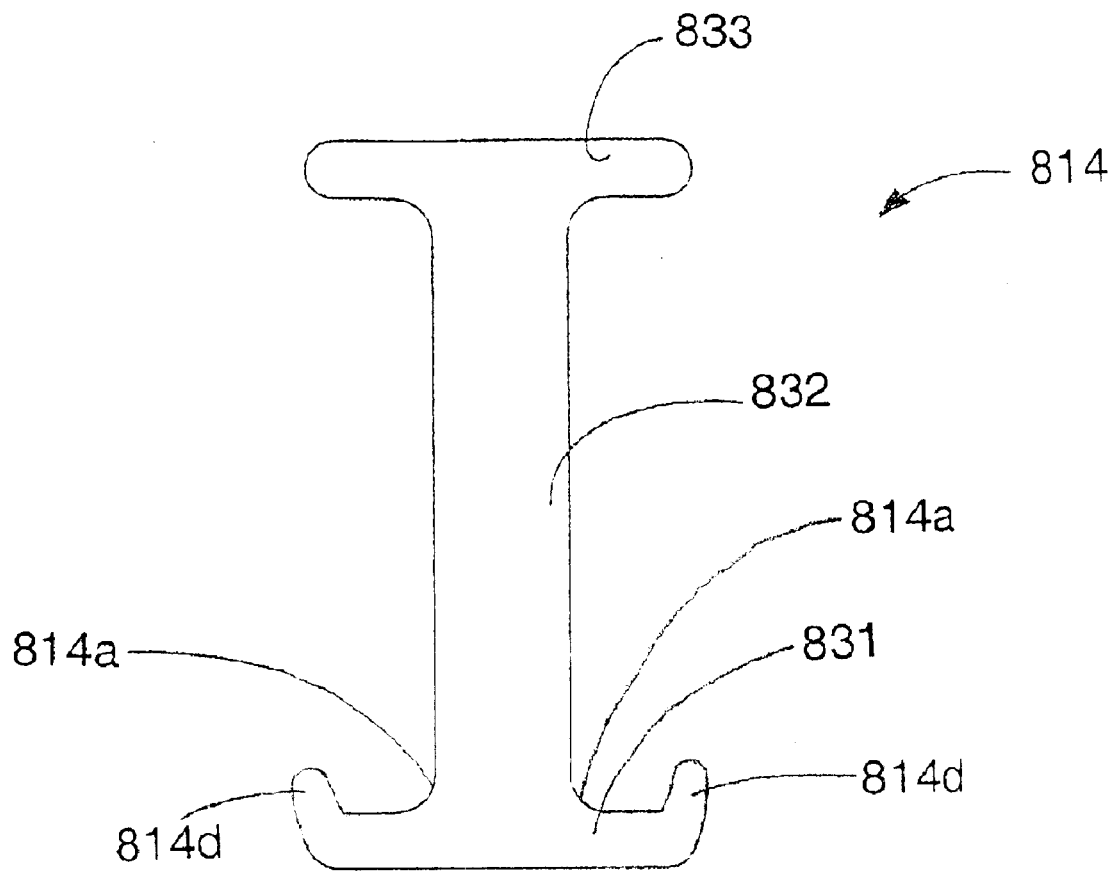
FIG. 16 is an enlarged elevational view of one of the plates used in the rotary electric motor in accordance with the ninth embodiment of the present invention illustrated in FIG. 15.

Referring now to FIGS. 15 and 16, a modified stator 810 in accordance with a ninth embodiment will now be explained. The modified stator 810 replaces the stator 10 of the electric machine 1 illustrated in FIG. 1. Thus, the modified stator 810 is used in conjunction with the parts (e.g., the rotor 22, the rotational shaft 23, the permanent magnets 24, the bearings 25 and the machine housing 26) of the electric machine 1 illustrated in FIG. 1. In view of the similarity between the first, third, sixth and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first, third, sixth and ninth embodiments may be omitted for the sake of brevity.

The stator 810 basically comprises a cylindrical stator core 811, a plurality of stator coils 812 wound through a plurality of slots 813 formed by the stator core 811. The stator core 811 further includes a plurality of installing plates 814 and a sealing member 815. Preferably, the stator core 811 is formed by a plurality of identically shaped magnetic steel plates laminated or layered in the axial direction relative to the rotation of the rotor 22. In this ninth embodiment, each of the magnetic steel plates of the stator core 811 is an integral structure instead of a divided structure as in the first embodiment. The stator core 811 is formed by a plurality of tooth parts 816 that extend inwardly in the radial direction from a ring-shaped back core part 817. The tooth parts 816 are located at equally spaced apart intervals with respect to the circumferential direction of the back core part 817. The tooth parts 816 have a pair of protrusions 818 with their rotor facing surfaces 818a slanted outwardly in the radial direction, similar to the first embodiment, but not as steep as in the first embodiment.

As best seen in FIG. 16, each of the plates 814 is formed in an "I" shape comprising: a main body 831, a leg part 832, and a holding part 833. The main body 831 is wider in the circumferential direction than the opening of the slot 813. The main body 831 is disposed on the inner radial sides of the protrusions 818. Each of the main bodies 831 has a pair of surfaces 814a that contacts two of the rotor facing surfaces 818a on the inner radial sides of the tips of adjacent pairs of the protrusion 818 that faces the rotor 22. The surfaces 814a are parts of large recesses or grooves formed on opposite sides of the leg part 832. Thus, each of the main body 831 blocks one of the inner radial openings of one of the slots 813.

The leg parts 832 are formed slightly narrower than the openings of the slots 813 and are disposed between adjacent pairs of the stator coils 812. The leg parts 832 are arranged such that they do not contact the stator coils 812 such that passages can be maintained for a cooling medium that cools the stator coils 812.

The holding part 833 (on outside of the plate 814) is wider than the leg part 832 in the circumferential direction of the stator 810 and is held in a groove or recess formed in the back core part 817.

This ninth embodiment is substantially the same as the third embodiment, except that the protrusions 818 of the tooth parts 816 are each provided with a grooves or recesses 820 that run in the axial direction along the rotor facing surfaces 818a that faces the rotor 22, and that the plates 814 are shaped such that their tips 814d on the side thereof that faces the rotor 22 are hook-shaped and fit into the grooves or recesses 820. This arrangement incorporates the features of the plates 514 of the sixth embodiment to improve the coupling performance between the plates 814 and the protrusions 818.

By holding the plates 814 at the back core part 817, the plates 814 can be retained such that they do not contact the radially outwardly facing surfaces of the protrusions 818. Thus, the contact area between the protrusions 818 and the cooling medium can be increased. Thus, the cooling of the protrusions 818 of the tooth parts 816, which reach the highest temperatures after the stator coils 812, can also be improved. Similarly to the second embodiment, by extending the plates 814 into the slots 813 does not change the contact surface area between the cooling medium and the stator coils 812 but merely narrows the flow passage. Therefore, it is possible to increase the flow speed and improve the cooling performance. Furthermore, since this structure supports the plates 814 vertically inside the slots 813, the positioning precision of the plates 814 within the slots 813 is improved.

Although the embodiments presented herein were applied to a permanent magnet type synchronous electric motor, the present invention can also be applied to other motors, such as induction motors and SR motors. Furthermore, although the embodiments concerned an electric motor, the rotary electric machine can also be a generator.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application. No. 2001-293360. The entire disclosure of Japanese Patent Application No. 2001-293360 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A rotary electric machine comprising:
   a machine housing having an interior area with a coolant inlet port and a coolant outlet port;
   a rotor rotatably coupled within the interior area of the machine housing; and
   a stator fixedly coupled within the interior area of the machine housing and disposed around the rotor, the stator comprising
      a stator core including a plurality of circumferentially spaced tooth parts forming a plurality of slots between adjacent pairs of the tooth parts, the tooth parts having tips that define openings of the slots,
      a plurality of protrusions protruding from both lateral surfaces of the tips of the tooth parts into the slots,
      a plurality of coils wound onto the tooth parts of the stator core and extending through the slots,
      a plurality of plates having recesses on circumferential sides with the protrusions of the adjacent pairs of the tooth parts being located in the recesses of the plates to block the openings of the slots and with the plates and the tooth parts defining axially extending joint lines, and
      a seal formed on rotor facing sides of the plates and facing sides of the tooth parts to extend across the joint lines, the seal being non-integrally formed as a separate and distinct element from the plates with the seal being molded onto the tooth parts and the plates to overlie the joint lines.

2. The rotary electric machine as recited in claim 1, wherein each of the protrusions includes a rotor facing surface that slants away from the rotor as the rotor facing surface extends toward corresponding one of the slots.

3. A rotary electric machine comprising:
   a machine housing having an interior area with a coolant inlet port and a coolant outlet port;
   a rotor rotatable coupled within the interior area of the machine housing; and
   a stator fixedly coupled within the interior area of the machine housing and disposed around the rotor, the stator comprising
      a stator core including a plurality of circumferentially spaced tooth parts forming a plurality of slots between adjacent pairs of the tooth parts, the tooth parts having tips that define openings of the slots,
      a plurality of protrusions protruding from both lateral surfaces of the tips of the tooth parts into the slots, a plurality of coils wound onto the tooth parts of the stator core and extending through the slots, a plurality of plates having recesses on circumferential sides with the protrusions of the adjacent pairs of the tooth parts being located in the recesses of the plates to block the openings of the slots, each of the plates including an extended leg part that is arranged to extend outwardly in a radial direction to be circumferentially located between adjacent pairs of the coils in a non-contacting manner, and a seal formed between rotor facing sides of the plates and the tooth parts.

4. The rotary electric machine as recited in claim 1, wherein each of the plates includes a rotor facing surface configured to be substantially concentric with an outer extending surface of the rotor.

5. A rotary electric machine comprising:

a machine housing having an interior area with a coolant inlet port and a coolant outlet port;

a rotor rotatable coupled within the interior area of the machine housing; and a stator fixedly coupled within the interior area of the machine housing and disposed around the rotor, the stator comprising a stator core including a plurality of circumferentially spaced tooth parts forming a plurality of slots between adjacent pairs of the tooth parts, the tooth parts having tips that define openings of the slots, a plurality of protrusions protruding from both lateral surfaces of the tips of the tooth parts into the slots, a plurality of coils wound onto the tooth parts of the stator core and extending through the slots, a plurality of plates having recesses on circumferential sides with the protrusions of the adjacent pairs of the tooth parts being located in the recesses of the plates to block the openings of the slots, and a seal formed between rotor facing sides of the plates and the tooth parts, each of the plates including a groove formed in a rotor facing surface with a portion of the seal being disposed therein.

6. A rotary electric machine comprising:

a machine housing having an interior area with a coolant inlet port and a coolant outlet port;

a rotor rotatably coupled within the interior area of the machine housing; and a stator fixedly coupled within the interior area of the machine housing and disposed around the rotor, the stator comprising a stator core including a plurality of circumferentially spaced tooth parts forming a plurality of slots between adjacent pairs of the tooth parts, the tooth parts having tips that define openings of the slots, a plurality of protrusions protruding from both lateral surfaces of the tips of the tooth parts into the slots, a plurality of coils wound onto the tooth parts of the stator core and extending through the slots, a plurality of plates having recesses on circumferential sides with the protrusions of the adjacent pairs of the tooth parts being located in the recesses of the plates to block the openings of the slots, and a seal formed between rotor facing sides of the plates and the tooth parts, each of the protrusions including a rotor facing surface having an axially extending groove, said grooves of said rotor facing surfaces being arranged to be substantially aligned in a circumferential direction and having circumferentially-facing tips of the plates disposed into the grooves.

7. A rotary electric machine comprising:

a machine housing having an interior area with a coolant inlet port and a coolant outlet port;

a rotor rotatably coupled within the interior area of the machine housing; and a stator fixedly coupled within the interior area of the machine housing and disposed around the rotor, the stator comprising a stator core including a plurality of circumferentially spaced tooth parts forming a plurality of slots between adjacent pairs of the tooth parts, the tooth parts having tips that define openings of the slots, a plurality of protrusions protruding from both lateral surfaces of the tips of the tooth parts into the slots, a plurality of coils wound onto the tooth parts of the stator core and extending through the slots, a plurality of plates arranged between adjacent pairs of the protrusions of the adjacent pairs of the tooth parts to block the openings of the slots, each of the plates comprising a main body contacting a rotor facing surface of the protrusions, a leg part arranged between adjacent pairs of the coils and formed with a width as not to contact the coils, and a holding part retained in a groove formed in the back core part, and a seal formed between rotor facing sides of the plates and the tooth parts.

8. The rotary electric machine as recited in claim 7, wherein each of the plates includes a rotor facing surface configured to be substantially concentric with an outer extending surface of the rotor.

9. The rotary electric machine as recited in claim 7, wherein each of the plates includes a groove formed in a rotor facing surface with a portion of the seal being disposed therein.

10. The rotary electric machine as recited in claim 7, wherein each of the protrusions includes a rotor facing surface having an axially extending groove, said grooves of said rotor facing surfaces being arranged to be substantially aligned in a circumferential direction and having circumferentially-facing tips of the plates disposed into the grooves.

11. A stator structure for a rotary electric machine comprising:

a stator core including a plurality of circumferentially spaced tooth parts forming a plurality of slots between adjacent pairs of the tooth parts, the tooth parts having tips that define openings of the slots;

a plurality of protrusions protruding from both lateral surfaces of the tips of the tooth parts into the slots;

a plurality of coils wound onto the tooth parts of the stator core and extending through the slots;

a plurality of plates having recesses on circumferential sides with the protrusions of the adjacent pairs of the tooth parts being located in the recesses of the plates to block the openings of the slots and with the plates and the tooth parts defining axially extending joint lines; and a seal formed on rotor facing sides of the plates and facing sides the tooth parts to extend across the joint lines, the seal being non-integrally formed as a separate and distinct element from the plates with the seal being molded onto the tooth parts and the plates to overlie the joint lines.

12. The stator structure as recited in claim 11, wherein each of the protrusions includes a rotor facing surface that slants away from the rotor as the rotor facing surface extends toward corresponding one of the slots.

13. A stator structure for a for a electric machine comprising:
- a stator core including a plurality of circumferentially spaced tooth parts forming a plurality of slots between adjacent pairs of the tooth parts, the tooth parts having tips that define openings of the slots;
- a plurality of protrusions protruding from both lateral surfaces of the tips of the tooth parts into the slots;
- a plurality of coils wound onto the tooth parts of the stator core and extending through the slots;
- a plurality of plates having recesses on circumferential sides with the protrusions of the adjacent pairs of the tooth parts being located in the recesses of the plates to block the openings of the slots, each of the plates including an extended leg part that is arranged to extend outwardly in a radial direction to be circumferentially located between adjacent pairs of the coils in a non-contacting manner; and
- a seal formed between rotor facing sides of the plates and the tooth parts.

14. The stator structure as recited in claim 11, wherein each of the plates includes a rotor facing surface configured to be substantially concentric with an outer extending surface of the rotor.

15. A stator structure for a rotary electric machine comprising:
- a stator core including a plurality of circumferentially spaced tooth parts forming a plurality of slots between adjacent pairs of the tooth parts, the tooth parts having tips that define openings of the slots;
- a plurality of protrusions protruding from both lateral surfaces of the tips of the tooth parts into the slots;
- a plurality of coils wound onto the tooth parts of the stator core and extending through the slots;
- a plurality of plates having recesses on circumferential sides with the protrusions of the adjacent pairs of the tooth parts being located in the recesses of the plates to block the openings of the slots; and
- a seal formed between rotor facing sides of the plates and the tooth parts,
- each of the plates including a groove formed in a rotor facing surface with a portion of the seal being disposed therein.

16. A stator structure for a rotary electric machine comprising:
- a stator core including a plurality of circumferentially spaced tooth parts forming a plurality of slots between adjacent pairs of the tooth parts, the tooth parts having tips that define openings of the slots;
- a plurality of protrusions protruding from both lateral surfaces of the tips of the tooth parts into the slots;
- a plurality of coils wound onto the tooth parts of the stator core and extending through the slots;
- a plurality of plates having recesses on circumferential sides with the protrusions of the adjacent pairs of the tooth parts being located in the recesses of the plates to block the openings of the slots; and
- a seal formed between rotor facing sides of the plates and the tooth parts,
- each of the protrusions including a rotor facing surface having an axially extending groove, said grooves of said rotor facing surfaces being arranged to be substantially aligned in a circumferential direction and having circumferentially-facing tips of the plates disposed into the grooves.

* * * * *